United States Patent [19]

Young

[11] Patent Number: 4,712,421

[45] Date of Patent: Dec. 15, 1987

[54] FUEL INJECTOR TESTING DEVICE

[76] Inventor: Jeffrey H. Young, 606 Ardmore Cir., Maryville, Tenn. 37801

[21] Appl. No.: 904,396

[22] Filed: Sep. 8, 1986

[51] Int. Cl.$^4$ ........................................ G01M 15/00

[52] U.S. Cl. ........................................ 73/119 A

[58] Field of Search ............................ 73/119 A, 168

[56] References Cited

U.S. PATENT DOCUMENTS 4,114,426 9/1978 McLean ............................ 73/168 X

FOREIGN PATENT DOCUMENTS 2086984 5/1982 United Kingdom ............. 73/119 A

*Primary Examiner*—Jerry W. Myracle

*Attorney, Agent, or Firm*—Pitts and Brittian

[57] ABSTRACT

An improved fuel injector testing device (10) for supplying a test fluid (24), under a selected pressure, to a fuel injector (12) to test the fuel spray pattern of the injector (12). The testing device (10) comprises a reservoir (22) for holding the test fluid (24) and pumping apparatus for pumping the test fluid (24) to the injector (12). Such pumping apparatus comprises a pump (26) provided with an inlet port (28) and an outlet port (30), and a fluid supply conduit (32) for establishing fluid communications between the reservoir (22) and the inlet port (28). The testing device (10) further comprises an injector supply for selectively engaging, and communicating test fluid (24) to the injector (12). The injector supply comprises an injector supply conduit (34) for establishing fluid communication between the outlet port (30) of the pump (26) and the injector (12), the injector supply conduit being provided with a first valve (36) for selectively terminating the flow of test fluid (24) to the injector (12). A pressure regulating apparatus is also provided for maintaining the test fluid (24) supplied to the injector (12) at a preselected pressure. The pressure regulating apparatus comprises a pressure regulator (46) defining an inlet port (48) in fluid communication with the injector supply conduit (34) and an outlet port (50) in fluid communication with the reservoir (22). The testing device further comprises electrical control (74) for connecting the pump (26) to a suitable power source.

14 Claims, 3 Drawing Figures

FUEL INJECTOR TESTING DEVICE

DESCRIPTION

1. Technical Field

This invention relates to an improved fuel injector testing device to test the fuel spray pattern of a fuel injector of an internal combustion engine. In this particular invention, the testing device includes a reservoir for holding a test fluid, pumping means for pumping the test fluid from the reservoir, and an injector supply means for communicating the test fluid from the pumping means to the injector.

2. Background Art

It has become common for internal combustion engines to utilize fuel injectors to supply fuel to the cylinders in an atomized state, thereby improving the efficiency of the engine. Further, for peak efficiency, it is desirable that the injector produce a cone-shaped fuel spray pattern. Occasionally, the fuel flow through the injector can become disrupted or blocked causing the engine to run less efficiently, or causing it to fail to run. It is, therefore, desirable to test the fuel spray pattern of the injector periodically, or when the engine malfunctions, to determine if the injector is properly distributing and atomizing the fuel. However, the fuel spray pattern of an injector cannot be examined while the injector is installed in the engine, and, thus, the injector must be removed for testing giving rise to the need to a testing device to supply fluid to an injector which has been removed from the engine. Moreover, to obtain an accurate representation of the spray pattern produced by the injector under normal operating conditions, the testing device must be capable of simulating the fuel supply conditions of normal injector use.

Certain fuel injector testing devices are disclosed in the prior art, such as the devices disclosed in the following U.S. Letters patents:

| U.S. Pat. No. | INVENTOR | ISSUED |
|---|---|---|
| 2,744,407 | F. B. Kruger, et al. | May 8, 1956 |
| 4,061,027 | R. S. Emerson | December 6, 1977 |
| 4,428,228 | Banzhaf, et al. | January 31, 1984 |

However, such testing devices tend to be either incapable of simulating the normal fuel supply conditions or extremely complex devices which are expensive to manufacture and maintain.

Therefore, it is an object of the present invention to provide an improved fuel injector testing device for testing the fuel spray pattern produced by a fuel injector.

It is a further object of the present invention to provide an improved fuel injector testing device which supplies a test fluid to an injector under conditions which simulate fuel supply conditions in an internal combustion engine.

Yet another object of the present invention is to provide an improved fuel injector testing device which is light weight and portable.

Still another object of the present invention is to provide a fuel injector testing device which is inexpensive to manufacture and maintain.

DISCLOSURE OF THE INVENTION

Other objects and advantages will be accomplished by the present invention which provides an improved fuel injector testing device for testing the fuel spray pattern of a fuel injector of an internal combustion engine. The test device of the present invention comprises a reservoir for holding a test fluid, and further comprises pumping means for pumping the test fluid to the injector to be tested. The pumping means includes a pump provided with an inlet port and an outlet port, and a fluid supply conduit for establishing fluid communications between the reservoir and the inlet port of the pump. The testing device also comprises an injector supply means for selectively engaging, and communicating test fluid to, the injector. The injector supply means includes an injector supply conduit for establishing fluid communication between the outlet port of the pump and the injector, the injector supply conduit being provided with a first valve for selectively terminating the flow of test fluid to the injector. A pressure regulating means is also provided for maintaining the test fluid supplied to the injector at a preselected pressure. The pressure regulating means comprises a pressure regulator defining an inlet port in fluid communication with the injector supply conduit and an outlet port in fluid communication with the reservoir. The testing device further comprises electrical control means for connecting the pump to a suitable power source.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

Figure 1:
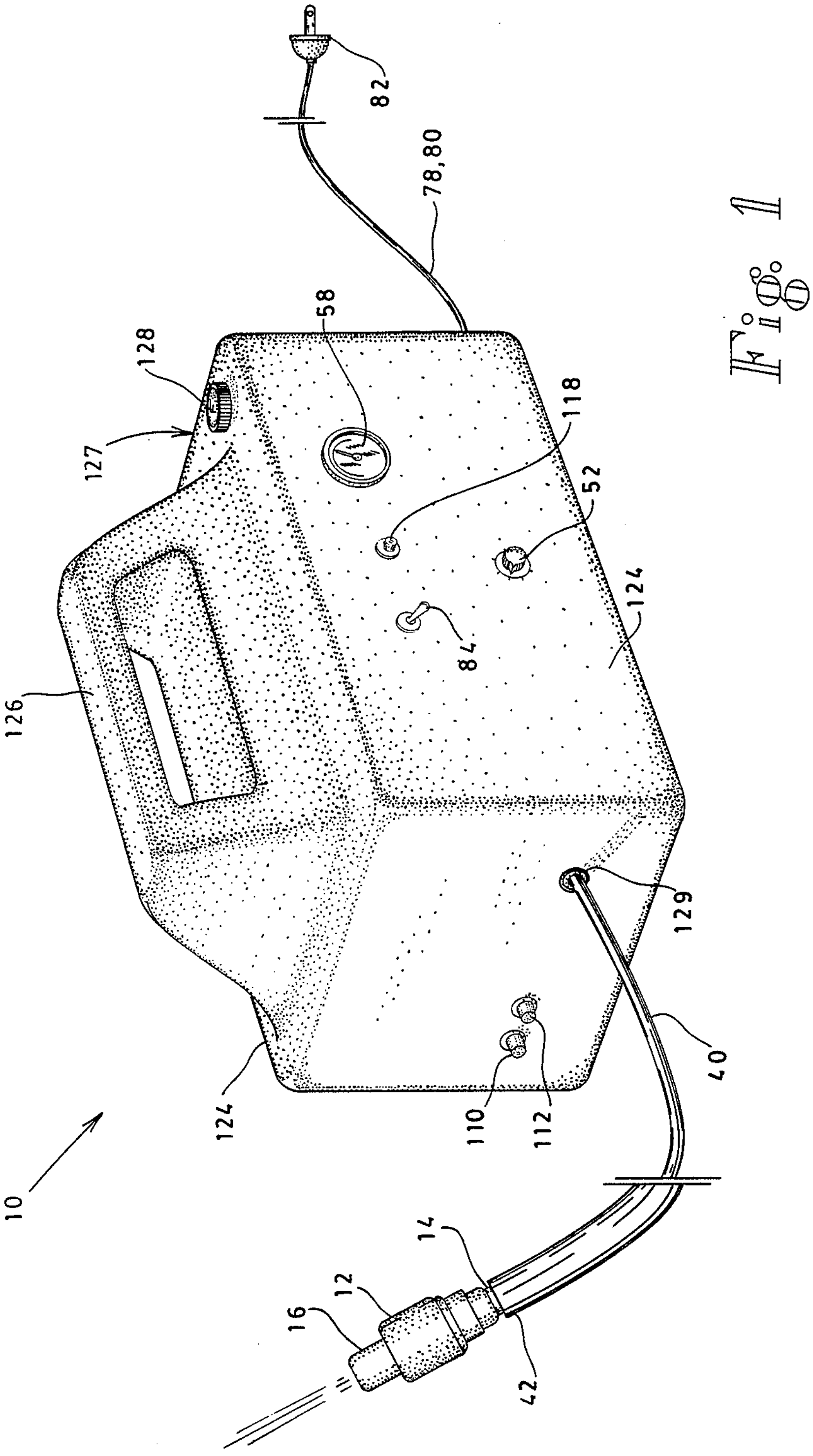
FIG. 1 illustrates a perspective view of the improved fuel injector testing device of the present invention.

A fuel injector testing device incorporating various features of the present invention is illustrated generally at 10 in the figures. The device 10 is designed to selectively supply a test fluid, under pressure, to a fuel injector 12 which has been removed from an internal combustion engine such that the injector's spray fuel spray pattern can be observed for proper distribution and atomization of fuel. The fuel injector 12 generally comprises an inlet port 14 for receiving fuel under pressure from a fuel supply system, and an outlet nozzle 16 out of which fuel is directed in an atomized state. The flow of fuel is selectively initiated and terminated by electrically actuated control means within the injector 12, the injector 12 being provided with the electrical terminals 18 and 20 for being electrically connected to the electrical system associated with the particular internal combustion engine in which the injector is being utilized.

Figure 2:
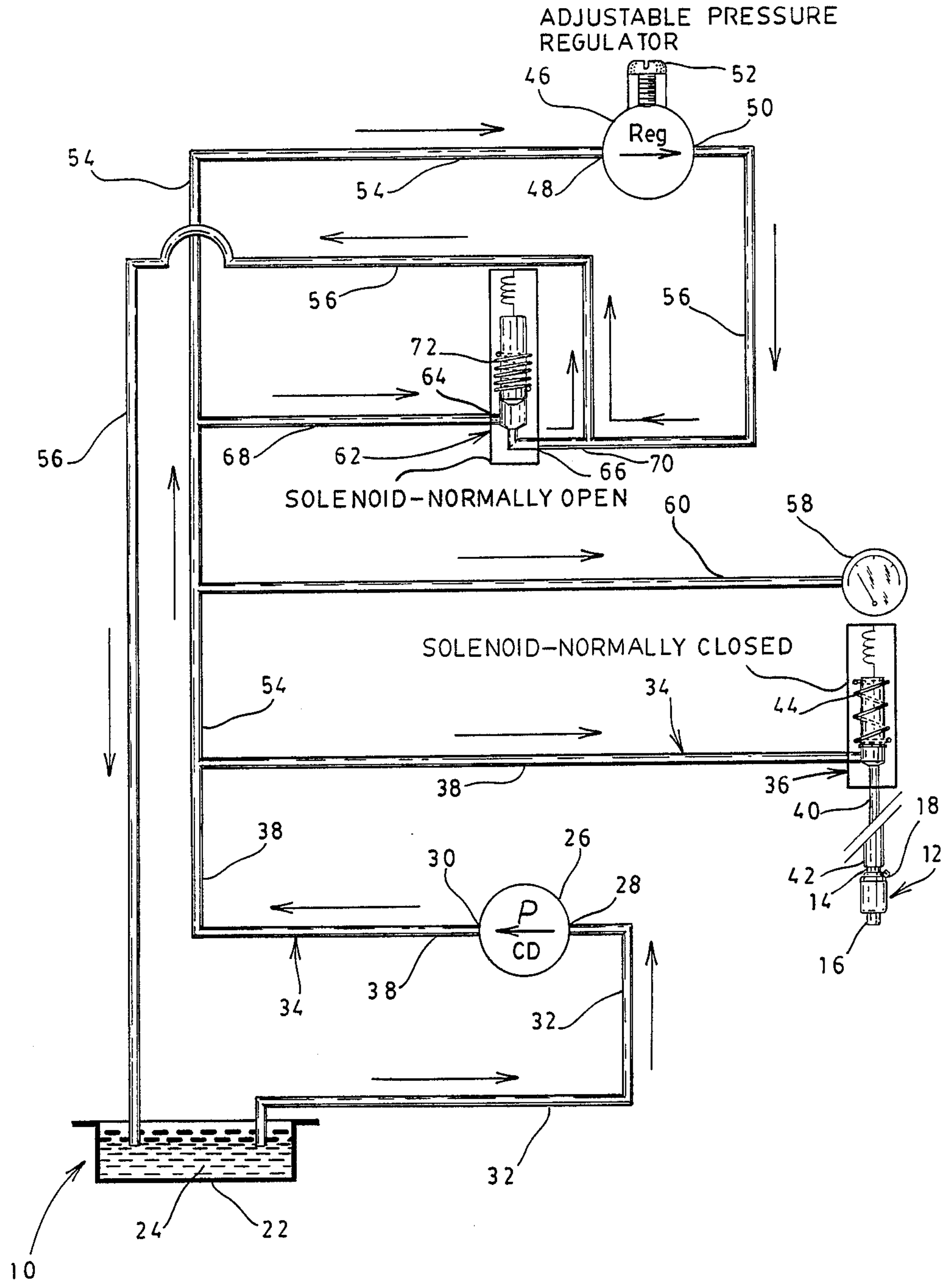
FIG. 2 is a diagrammatical illustration of the various components of the testing device of the present invention.

As illustrated in FIG. 2, the testing device 10 comprises a reservoir 22 for receiving a supply of test fluid 24. It will be appreciated by those skilled in the art that various substances can be used as the test fluid 24, including the fuel which would normally be used in the associated internal combustion engine. However, it will be understood that use of fuels such as gasoline and diesel fuel outside of the controlled environment of the engine can be hazardous. Accordingly, it is desirable to utilize a test fluid 24 which is less flammable, but which has substantially the same viscosity as the fuel normally utilized by the associated engine. For example, where the injector is being utilized to inject gasoline, a solvent such as Varsol has been found to be a suitable test fluid. It is also desirable to select a brightly colored test fluid such that the spray from the outlet nozzle 16 of the injector 12 can be readily seen during the testing operation.

The testing device 10 further comprises a pumping means for pumping the test fluid 24 from the reservoir 22 to the injector 12, such means comprising a pump 26 having an inlet port 28 and an outlet port 30. A fluid supply conduit 32 is provided for establishing fluid communication between the reservoir 22 and the inlet port 28 such that test fluid 24 can be drawn from the reservoir 22 by the pump 26. In order to communicate the test fluid 24 to the injector 12, injector supply means are provided, such means comprising an injector supply conduit 34 provided with a valve 36 for selectively interrupting the flow of the test fluid 24 through the injector supply conduit 34. More specifically, the injector supply conduit 34 comprises a first portion 38 for establishing fluid communication between the outlet port 30 of the pump 26 and the valve 36, and a second portion 40 for establishing fluid communication between the valve 36 and the injector 12. Of course, it will be appreciated that the distal end portion 42 of the second portion 40 of the conduit 34 is provided with suitable means for sealably engaging the injector 12, such engaging means varying depending upon the injector 12 to be tested. Further, in the preferred embodiment the valve 36 is actuated by a first solenoid 44 and is set to a normally closed position, as will be discussed further below.

In light of the above, it will be understood that during the testing operation, the pump 26 draws test fluid 24 from the reservoir 22 and pumps the fluid 24 into the first portion 38 of the conduit 34. Suitable control means, discussed below serve to open the normally closed valve 36 to allow the fluid 24 to be pumped through the second portion 40 of the conduit 34 to the injector 12 such that the fuel spray pattern can be examined. However, it will be appreciated by those skilled in the art that in order to obtain an accurate simulation of the fuel spary pattern as it would occur in the environment of the internal combustion engine, it is necessary for the test fluid 24 to be supplied to the injector 12 under substantially the same pressure as fuel is supplied to the injector 12 in normal operation. Accordingly, the improved fuel injector tester 10 is provided with pressure regulating means for maintaining fluid pressure in the injector supply conduit 34 at a preselected pressure.

In the preferred embodiment such pressure regulating means comprises an adjustable pressure regulator 46 defining an inlet port 48, an outlet port 50, and a suitable pressure adjustment control means 52. A pressure regulator supply conduit 54 is provided for establishing fluid communication between the injector supply conduit 34 and the inlet port 48 of the regulator 46, and a fluid return conduit 56 is provided for establishing fluid communication between the outlet port 50 of the regulator 46 and the reservoir 22. As will be understood by those skilled in the art, the regulator 46 dissipates fluid pressure beyond the desired preselected pressure by venting test fluid 24 into the return conduit 56 to be returned to the reservoir 22. Thus, to effect a proper test of the injector 12, the control means 52 is adjusted such that the fluid pressure within the conduit 34 closely simulates actual fuel feed conditions and such that the spray pattern produced by the injector 12 is equivalent to that produced during actual operation of the injector 12. In order to monitor the fluid pressure within the injector supply conduit 34 such that fluid pressure can be properly regulated, the preferred embodiment of the tester 10 is provided with a pressure gauge 58. As illustrated in FIG. 2, the gauge 58 is placed in fluid communication with the regulator supply conduit 54 via the gauge access conduit 60. However, it will be appreciated that direct fluid communication between the gauge 58 and the injector supply conduit 34 may be utilized.

In order to depressurize the conduits 34 and 54 upon termination of the testing operation, and to at least partially drain the conduits 34 and 54 of test fluid 24, the preferred embodiment of the tester 10 is provided with a pressure regulator by-pass means. Such by-pass means comprises a second valve 62 having an inlet port 64 and an outlet port 66. A first by-pass conduit 68 is provided for establishing fluid communication between the pressure regulator supply conduit 54 (or the injector supply conduit 34, if desired), and the inlet port 64 of the valve 62. Further, a second by-pass conduit 70 is provided for establishing fluid communication between the outlet port 66 of the valve 62 and the return conduit 56. Thus, when the valve 62 is in an open position, fluid is allowed to flow directly from the regulator supply conduit 54 to the fluid return conduit 56, thereby by-passing the pressure regulator 46. As will be discussed in detail below, in the preferred embodiment the second valve 62 is actuated by a second solenoid 72 which is normally set to an open position.

Figure 3:
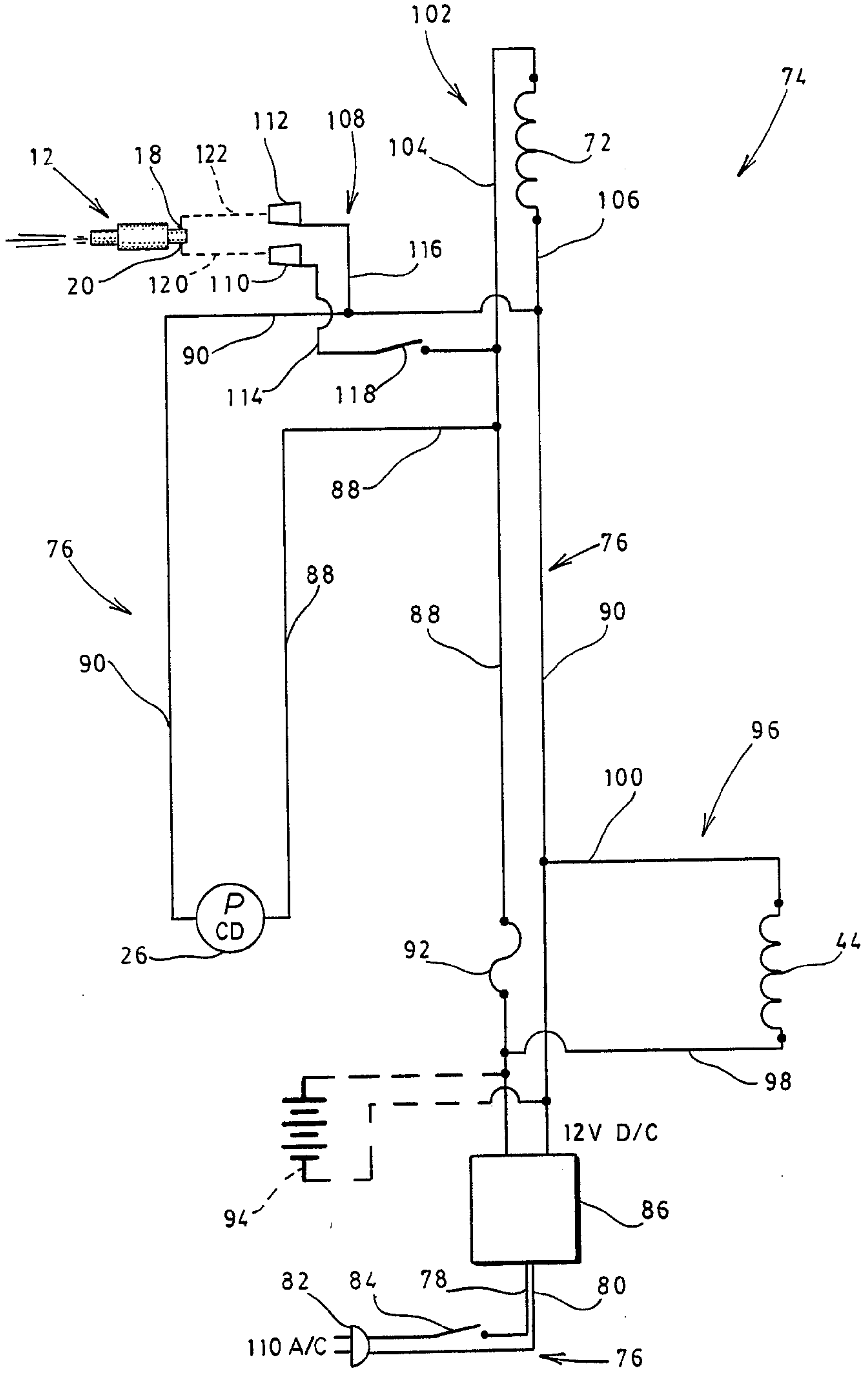
FIG. 3 is a schematic illustration of the electrical control means of the testing device of the present invention.

In order to electrically energize and control the pump 26 and the solenoids 44 and 72 of the valves 36 and 62, respectively, the preferred embodiment of the testing device 10 is provided with the electrical control means schematically illustrated in FIG. 3 at 74. The control means 74 comprises a first circuit 76 for energizing and controlling the pump 26. The first circuit 76 comprises a pair of leads 78 and 80 carrying a plug 82 for being received in a standard 110 A/C electrical outlet, with a main power switch 84 being interposed in series on line 78. The leads 78 and 80 are connected to a transformer/rectifier 86 which converts the alternating current to direct current at the desired voltage (12 volts in the preferred embodiment). The pump 26 is electrically connected to the transformer/rectifier 86 with the leads 88 and 90. Thus, it will be appreciated that by manipulating the main power switch 84, the pump 26 can be selectively turned "on" and "off". Of course, a fuse, such as the illustrated fuse 92, can be interposed on lead 88 to protect the circuit. Further, if desired, a battery 94 (preferably 12 volts) can be utilized as an alternative power supply, replacing the 110 volt service and the transformer/rectifier.

The control means 74 further comprises a second control circuit 96 for selectively opening the valve 36, thus allowing test fluid 24 to be communicated to the injector 12. The second control circuit 96 comprises the first solenoid 44 (on valve 36) and a pair of leads 98 and 100 which connect the solenoid 44 to the leads 88 and 90, respectively. Accordingly, it will be recognized that the closing of the main power switch 84 energizes the solenoid 44, thereby opening the normally closed valve 36.

In order to selectively close the normally open second valve 62 such that test fluid 24 no longer by-passes the pressure regulator 46, a third control circuit 102 is provided. The third control circuit 102 comprises the second solenoid 72 (on valve 62), and a pair of leads 104 and 106 which connect the solenoid 72 to the leads 88 and 90, respectively. Therefore, as the main power switch 84 is closed, the solenoid 72 is energized and serves to close the normally open valve 62, so as to close the pressure regulator by-pass. Thus, it will be recognized that by closing the main power switch 84, pumping of the test fluid 24 is initiated; the first valve 36 opens to allow test fluid 24 to flow to the injector 12; and the second valve 62 closes so as to engage the pressure regulating means.

As indicated above, the fuel injector 12 is provided with the terminals 18 and 20 to allow control means within the injector 12 to be electrically actuated to open the injector 12 to the flow of fuel. Accordingly, in order to test the injector 12, the control means of the injector 12 must be selectively energized. Therefore, the preferred embodiment of the electrical control means 74 includes a fourth control circuit 108. The control circuit 108 comprises a pair of terminals 110 and 112 connected to the leads 88 and 90, respectively, with the leads 114 and 116. Further, a switch 118 is interposed in series on lead 114. The terminals 110 and 112 serve to receive a pair of external leads 120 and 122 which engage the terminals 18 and 20 of the injector 12. Accordingly, when the main power switch 84 is in a closed position, the closing of the switch 118 allows the control means of the injector 12 to be energized, opening the injector 12.

Of course, the above described control means 74 comprises only one preferred control means for controlling the various components and functions of the testing device 10, and it will be understood that other suitable control means can be utilized, if desired.

Referring now to FIG. 1, in the preferred embodiment, the testing device 10 is housed in a portable housing 124, the housing 124 defining a handle 126 for carrying the device 10. The housing 124 is preferably fabricated from a durable yet light weight plastic material; however, it can be fabricated from aluminum sheet metal or other suitable semi-rigid stock. The housing 124 is provided with an access opening 127 for accessing the reservoir 22, with a suitable cap 128 being provided for selectively closing the access opening 127. An opening 129 is also provided in the housing 124 for receiving the second portion 40 of the conduit 34 such that a selected portion of the conduit 34 remains exterior to the housing 124. Further, the main switch 84, the switch 118 (shown as a button in FIG. 1), the pressure gauge 58, the control means 52 of the regulator 46, and the terminals 110 and 112 are all mounted in the walls of the housing 124 for ready access.

From the foregoing detailed description and the drawings, it will be apparent that an improved portable fuel injector testing device has been provided which allows the fuel spray pattern of a fuel injector to be examined. More specifically, the testing device 10 allows fuel flow conditions of an internal combustion engine to be simulated such that the fuel injector can be removed from the engine, and quickly and easily tested to determine whether it is functioning properly. Further, the testing device 10 is fully portable such that it can be easily transported from one work location to another and powered by either a battery (such as an automobile battery) or by utilizing a standard wall plug.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A portable fuel injector testing device for supplying a test fluid, under a preselected pressure, to a fuel injector of the type utilized for injecting fuel in an internal combustion engine to test and visually view the fuel spray pattern of said fuel injector when said injector is removed from said engine, said fuel injector having an inlet port for receiving said fuel, an outlet nozzle for generating said fuel spray pattern, and internal electrical control means, said fuel injector testing device being electrically powered by a suitable electrical power supply, said fuel injector testing device comprising:

- a reservoir for holding said test fluid;
- pumping means for pumping said test fluid, said pumping means having a pump provided with an inlet port and an outlet port, and a fluid supply conduit for establishing fluid communication between said inlet port of said pump and said reservoir, whereby said pump selectively pumps said test fluid from said reservoir into said inlet port and out of said outlet port of said pump under pressure;
- injector supply means for selectively engaging, and communicating said test fluid to, said fuel injector, said injector supply means having an injector supply conduit for establishing fluid communication between said outlet port of said pump and said inlet port of said fuel injector, said injector supply conduit being provided with a first electrically controlled valve for selectively initiating and interrupting the flow of said test fluid to said fuel injector to generate and cease said spray pattern, respectively;
- pressure regulating means for maintaining said test fluid supplied to said fuel injector at said preselected pressure, said pressure regulating means having a pressure regulator defining an inlet port in fluid communication with said injector supply conduit and an outlet port, and a fluid return conduit for establishing fluid communication between said outlet port of said pressure regulator and said reservoir whereby said test fluid communicated through said pressure regulator is returned to said reservoir;
- a first electrical control circuit connected between said pump and said electrical power supply for selective operation of said pump;
- a second electrical control circuit connected to said first electrically controlled valve for selectively controlling flow of said test fluid to said fuel injector; and
- a third electrical control circuit connected to said electrical control means of said injector to selectively energize said control means to produce said spray pattern when said test fluid is provided to said fuel injector by said first electrically controlled valve.

2. The improved fuel injector testing device of claim 1 wherein said testing device further comprises pressure regulator by-pass means for selectively releasing fluid pressure within said injector supply conduit and said pressure regulating means, said by-pass means including a second electricallly controlled valve provided with an inlet port in fluid communication with said injector supply conduit and an outlet port in fluid communication with said reservoir, whereby said second electrically controlled valve can be selectively opened to provide for direct fluid communication between said injector supply conduit and said reservoir thereby bypassing said pressure regulator.

3. The improved fuel injector testing device of claim 2 wherein said first control circuit comprises a main power switch for selectively actuating said pump, wherein said second control circuit is connectec to said first control circuit whereby said first electrically controlled valve is selectively energized through the manipulation of said main power switch, and further comprises a fourth electrical control circuit connected between said second electrically controlled valve and said first control circuit whereby said second electrically controlled valve is selectively energized through the manipulation of said main power switch.

4. The improved fuel injector testing device of claim 2 wherein said testing device includes a housing for facilitating the portability of said testing device.

5. The improved fuel injector testing device of claim 1 wherein said pressure regulating means further comprises a pressure gauge in fluid communication with said injector supply conduit for monitoring fluid pressure in said injector supply conduit.

6. The improved fuel injector testing device of claim 1 wherein said pressure regulator of said pressure regulating means comprises regulator control means for selectively altering the fluid pressure in said injector supply conduit.

7. An improved fuel injector testing device for supplying a test fluid, under a preselected pressure, to a fuel injector utilized for injecting fuel in an internal combustion engine to test the fuel spray pattern of said fuel injector, said fuel injector comprising an inlet port for receiving said fuel and an outlet nozzle for generating said spray pattern, and further comprising electrical control means for selectively actuating said fuel injector to produce said fuel spray pattern, said fuel injector testing device being electrically powered by a suitable electrical power supply, said fuel injector testing device comprising:

a reservoir for holding said test fluid;

pumping means for pumping said test fluid, said pumping means comprising a pump provided with an inlet port and an outlet port, and comprising a fluid supply conduit for establishing fluid communication between said inlet port of said pump and said reservoir, whereby said pump selectively pumps said test fluid from said reservoir into said inlet port and out of said outlet port of said pump under pressure;

injector supply means for selectively engaging, and communicating said test fluid to, said fuel injector, said injector supply means comprising an injector supply conduit for establishing fluid communication between said outlet port of said pump and said inlet port of said fuel injector, said injector supply conduit being provided with a first valve for selectively interrupting the flow of said test fluid to said fuel injector;

pressure regulating means for maintaining said test fluid supplied to said fuel injector at said preselected pressure, said pressure regulating means comprising a pressure regulator defining an inlet port in fluid communication with said injector supply conduit and an outlet port, and comprising a fluid return conduit for establishing fluid communication between said outlet port of said pressure regulator and said reservoir whereby said test fluid communicated through said pressure regulator is returned to said reservoir, and further comprising a pressure gauge in fluid communication with said injector supply conduit for monitoring the fluid pressure in said injector supply conduit;

pressure regulator by-pass means for selectively releasing fluid pressure within said injector supply conduit, said by-pass means comprising a second valve provided with an inlet port in fluid communication with said injector supply conduit and an outlet port in fluid communication with said reservoir, whereby said valve can be selectively opened to provide for direct fluid communication between said injector supply conduit and said reservoir; and electrical control means for being selectively connected to said electrical power supply, said electrical control means comprising a first control circuit for selectively energizing said pump; a second control circuit including a first solenoid for selectively opening said first valve to the flow of said test fluid whereby said test fluid is communicated to said fuel injector; a third control circuit including a second solenoid for selectively closing said second valve to the flow of said test fluid; and a fourth control circuit for being connected to said electrical control means of said fuel injector for selectively actuating said injector to produce said fuel spray pattern.

8. The improved fuel injector testing device of claim 7 wherein said first control circuit is provided with means for connecting said first circuit to said power source and comprises a main power switch for selectively actuating said pump, said second control circuit and said third control circuit being connected to said first control circuit such that said first solenoid and said second solenoid are selectively energized by said main power switch, whereby said first valve remains open to the flow of said test fluid, and said second valve remains close to the flow of said test fluid, while said pump is operating.

9. The improved fuel injector testing device of claim 8 wherein said fourth control circuit is provided with an injector actuating switch for selectively actuating said control means of said fuel injector.

10. The improved fuel injector testing device of claim 9 wherein said testing device comprises a housing for facilitating the portability of said testing device.

11. The improved fuel injector testing device of claim 10 wherein said housing defines a handle for carrying said testing device, and defines an access opening for accessing said reservoir, said access opening being provided with a suitable closure for selectively closing said access opening.

12. The improved fuel injector testing device of claim 10 wherein said housing defines a first opening for receiving a selected portion of said injector supply conduit, whereby said selected portion of said injector supply conduit is exterior to said housing.

13. The improved fuel injector testing device of claim 12 wherein said main switch, said injector actuating switch, said pressure gauge, and said control means of said regulator are mounted on said housing.

14. The improved fuel injector testing device of claim 7 wherein said fourth control circuit is provided with an injector actuating switch for selectively actuating said control means of said fuel injector.

* * * * *